US008631223B2

(12) United States Patent
Abernathy et al.

(10) Patent No.: US 8,631,223 B2
(45) Date of Patent: Jan. 14, 2014

(54) REGISTER FILE SUPPORTING TRANSACTIONAL PROCESSING

(75) Inventors: Christopher M. Abernathy, Austin, TX (US); Mary D. Brown, Austin, TX (US); Hung Q. Le, Austin, TX (US); Dung Q. Nguyen, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 883 days.

(21) Appl. No.: 12/778,235

(22) Filed: May 12, 2010

(65) Prior Publication Data

US 2011/0283096 A1 Nov. 17, 2011

(51) Int. Cl.
*G06F 9/30* (2006.01)

(52) U.S. Cl.
USPC .......................................... 712/217; 712/228

(58) Field of Classification Search
None
See application file for complete search history.

(56) References Cited

U.S. PATENT DOCUMENTS

| 6,263,416 | B1 | 7/2001 | Cherabuddi | |
|---|---|---|---|---|
| 6,286,027 | B1 | 9/2001 | Dwyer, III et al. | |
| 6,311,261 | B1 * | 10/2001 | Chamdani et al. | 712/23 |
| 6,314,511 | B2 | 11/2001 | Levy et al. | |
| 6,633,970 | B1 * | 10/2003 | Clift et al. | 712/217 |
| 6,862,664 | B2 * | 3/2005 | Tremblay et al. | 711/137 |
| 7,143,267 | B2 | 11/2006 | Fluhr et al. | |
| 7,155,599 | B2 | 12/2006 | Jourdan et al. | |
| 7,284,092 | B2 | 10/2007 | Nunamaker et al. | |
| 7,409,503 | B2 | 8/2008 | Steely et al. | |
| 7,506,139 | B2 | 3/2009 | Burky et al. | |
| 7,523,266 | B2 | 4/2009 | Chaudhry et al. | |
| 7,669,203 | B2 | 2/2010 | Samra et al. | |
| 7,711,898 | B2 * | 5/2010 | Sodani et al. | 711/118 |
| 2004/0128448 | A1 | 7/2004 | Stark et al. | |
| 2005/0120179 | A1 | 6/2005 | Akkary et al. | |
| 2006/0020775 | A1 * | 1/2006 | Madriles et al. | 712/235 |
| 2007/0083735 | A1 | 4/2007 | Glew | |
| 2008/0082893 | A1 | 4/2008 | Wang | |
| 2008/0133893 | A1 * | 6/2008 | Glew | 712/220 |

(Continued)

FOREIGN PATENT DOCUMENTS

WO 2004/059472 A2 7/2004

OTHER PUBLICATIONS

Cruz, .J. etal., Multiple Banked Register File Architectures, 2000, ACM, pp. 316-325.*

(Continued)

*Primary Examiner* — Eric Coleman
(74) *Attorney, Agent, or Firm* — Yudell Isidore Ng Russell PLLC

(57) ABSTRACT

A processor includes an instruction sequencing unit, execution unit, and multi-level register file including a first level register file having a lower access latency and a second level register file having a higher access latency. Responsive to the processor processing a second instruction in a transactional code section to obtain as an execution result a second register value of the logical register, the mapper moves a first register value of the logical register to the second level register file, places the second register value in the first level register file, marks the second register value as speculative, and replaces a first mapping for the logical register with a second mapping. Responsive to unsuccessful termination of the transactional code section, the mapper designates the second register value in the first level register file as invalid so that the first register value in the second level register file becomes the working value.

27 Claims, 9 Drawing Sheets

(56) References Cited

U.S. PATENT DOCUMENTS

2008/0201563 A1* 8/2008 Dale et al. .................... 712/234
2008/0276076 A1 11/2008 Abernathy et al.
2009/0217013 A1* 8/2009 Caprioli ........................ 712/228

OTHER PUBLICATIONS

Balasubramonian, R., etal., Reducing the Complexity of the Register File in Dynamic Superscalar Processors, 2001, IEEE, pp. 237-248.*
Zalamea, J., etal., Hierarchical Clustered Register file Organization of VLIW Processors, 2003, IEEE, 10 pages.*
Lipasti, M.H., etal., Physical Register Inlining, 2004, IEEE, 11 pages.*
International Application No. PCT/EP2011/057269, International Search Report and Written Opinion dated Jul. 7, 2011.
Golander et al., Tel-Aviv University; Checkpoint Allocation and Release; ACM Transactions on Architecture and Code Optimization, vol. 6, No. 3, Article 10, Sep. 2009; 27 pp.
Ergin et al., 'Early Register Deallocation Mechanisms Using Checkpointed Register Files'; IEEE Computer Society, IEEE Transactions on Computers, vol. 55, No. 9, Sep. 2006; pp. 1153-1166.
Gummattira et al., "Register Hierarchy", Rice University, Dept. of Computer Science and Electrical Engineering, 2002 Spring ELEC-525, Advanced Microprocessor Architecture, Apr. 2002, pp. 1-9.
Cruz, et al., "Multiple-Banked Register File Architectures", Proceedings of the 27th International Symposium on Computer Architecture, Jun. 2000, pp. 316-325.
Rixner, et al., "Register Organization for Media Processing", Proceedings of Sixth International Symposium on High-Performance Computer Architecture, Jan. 2000, pp. 375-386.
Zeng, et al., "Register File Caching for Energy Efficiency", Proceedings of International Symposium on Low Power Electronics and Design, Oct. 2006, pp. 244-249.
Lo, Jack, et al. "Software-Directed Register Deallocation for Simultaneous Multithreaded Processors"; IEEE Transactions on Parallel and Distributed Systems (Sep. 1999); pp. 922-933, vol. 10(9).
Albrecht, Carsten et al.; "Cooperative Software Multithreading to Enhance Utilization of Embedded Processors for Network Applications"; IEEE Proceedings of the 12th Euromicro Conference on Parallel, Distributed and Network-Based Processing (EUROMICRO-PDP 2004); pp. 1-8.
Emer, Joel; "Simultaneous Multithreading: Multiplying Alpha Performance"; Compaq Computer Corporation (1999); pp. 1-23.
U.S. Appl. No. 12/884,411 entitled "Multi-Level Register File Supporting Multiple Threads"; Non-final office action dated Feb. 27, 2013 (24 pp.).

* cited by examiner

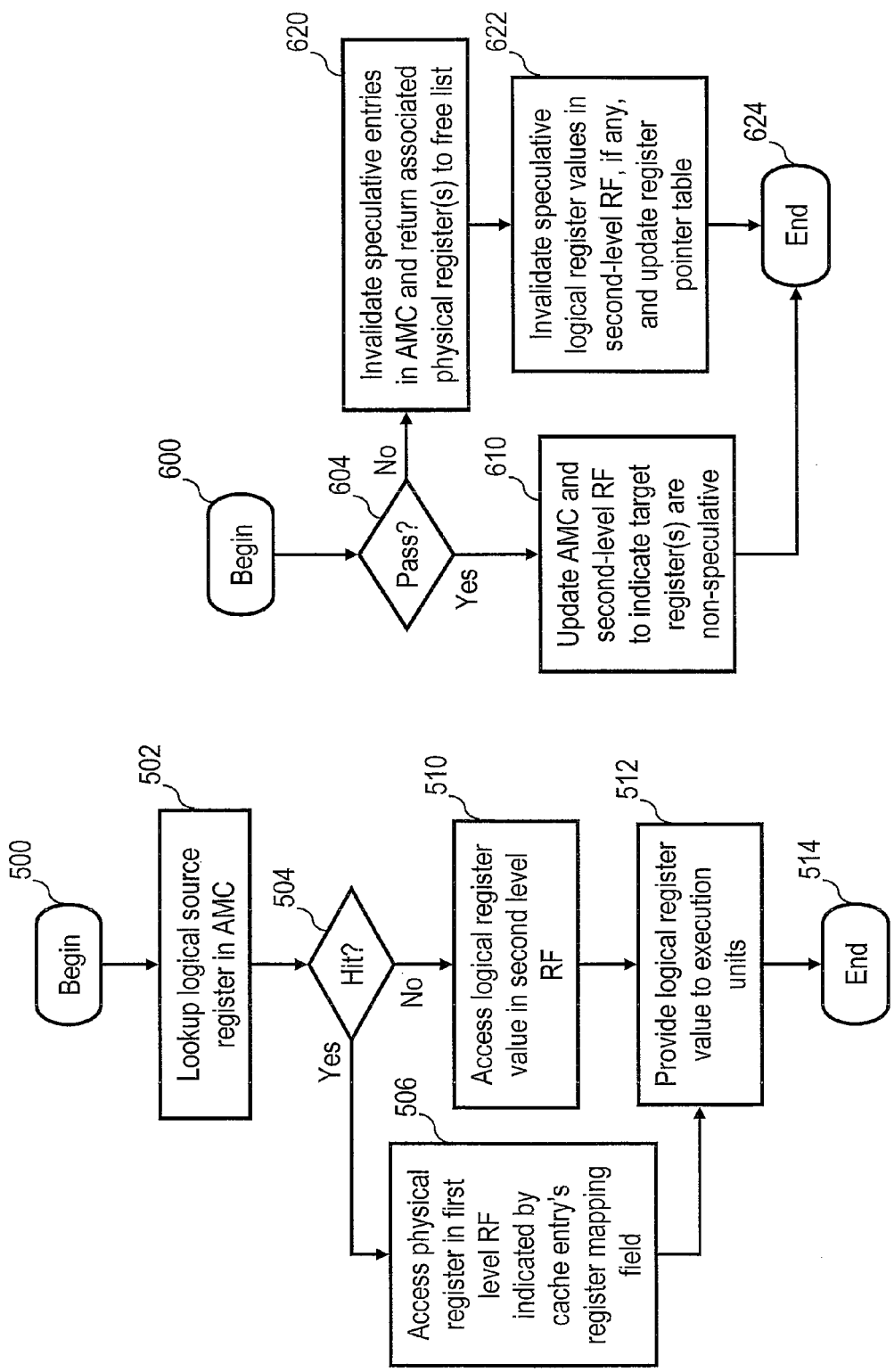

REGISTER FILE SUPPORTING TRANSACTIONAL PROCESSING

BACKGROUND OF THE INVENTION

1. Technical Field

The present invention relates in general to data processing, and in particular, to transactional processing in data processing systems.

2. Description of the Related Art

With the rise of multi-core, multi-threaded data processing systems, a key performance consideration is the coordination of the processing performed by multiple concurrent threads. In conventional systems, coordination of processing between threads is commonly achieved through the use of mutex (mutually exclusive) locks in memory. Typically, a mutex lock is associated with a portion of a shared data set, and prior to entering a code section that modifies that portion of the shared data set, a thread must acquire the associated mutex lock. After the code section is complete, the thread then releases the mutex lock, making it available for acquisition by the other concurrent threads.

Mutex locks thus synchronize access to the shared data set among multiple concurrent threads, but do so with significant overhead as each of the concurrent threads consumes cycles acquiring and releasing the mutex locks corresponding to various portions of the shared data set. It should also be noted that the use of mutex locks also leads to thread stalls, since a thread requiring a mutex lock held by another concurrent thread must suspend processing until the mutex lock is released by the other thread.

Another commonly employed alternative or additional technique for coordinating the processing of multiple threads is the execution of atomic memory access instruction pairs, such as load-and-reserve and store-conditional. To support atomic memory access, each processing element is equipped with one reservation register per-thread for holding the memory address of a reserved memory location. Upon execution of a load-and-reserve instruction in a thread, the load target address is recorded in the reservation register of that thread and is said to be "reserved" by the thread. While an address is reserved, storage modifying operations by other threads are monitored to detect any storage-modifying access to the reserved address, which would cancel the reservation. If no intervening storage-modifying operation is detected following establishment of the reservation and prior to execution by the reserving thread of a store-conditional instruction targeting the reserved address, the store-conditional instruction succeeds in updating the reserved address. If, however, a storage-modifying operation targeting the reserved address is detected between establishment of the reservation and execution of the store-conditional instruction, the reservation is canceled, and the store-conditional instruction fails. In this case, the reserving thread is typically programmed to loop back and again obtain a reservation for the same address.

As with lock-based thread synchronization, thread synchronization through the use of atomic memory access instruction pairs is also subject to high overhead costs. In particular, a separate reservation must be acquired (possibly many times) for each memory address to which access is synchronized, leading to substantial code overhead in cases in which access to numerous memory address is to be synchronized.

Because of the overhead concerns associated with conventional mutex locks and atomic memory access instruction pairs, recently developed multi-threaded data processing systems employ transactional processing in which a thread executes critical code sections atomically, only committing data results of a critical code section to the architected state if no other thread performs a conflicting data access during execution of the critical code section. Thus, in cases in which a conflicting data access is detected during transactional processing of a critical code section, the data processing system must discard any speculative data results obtained during execution of the critical code section and revert to the architected state of the thread.

SUMMARY OF THE INVENTION

In one embodiment, a data processing system that efficiently handles transactional processing includes a processor having an instruction sequencing unit, execution unit, and multi-level register file including a first level register file having a lower access latency and a second level register file having a higher access latency. Responsive to the processor processing a second instruction in a transactional code section to obtain as an execution result a second register value of the logical register, the mapper moves a first register value of the logical register to the second level register file, places the second register value in the first level register file, marks the second register value as speculative, and replaces a first mapping for the logical register with a second mapping. Responsive to unsuccessful termination of the transactional code section, the mapper designates the second register value in the first level register file as invalid so that the first register value in the second level register file becomes the working value.

BRIEF DESCRIPTION OF THE DRAWINGS

FIG. 5 is a high level logical flowchart of an exemplary process of translating a reference by an instruction to a logical source register in accordance with one embodiment;

FIG. 6 is a high level logical flowchart of an exemplary process by which a mapper manages the termination of transactional execution of a code section in one embodiment;

DETAILED DESCRIPTION OF ILLUSTRATIVE EMBODIMENT

Figure 1:
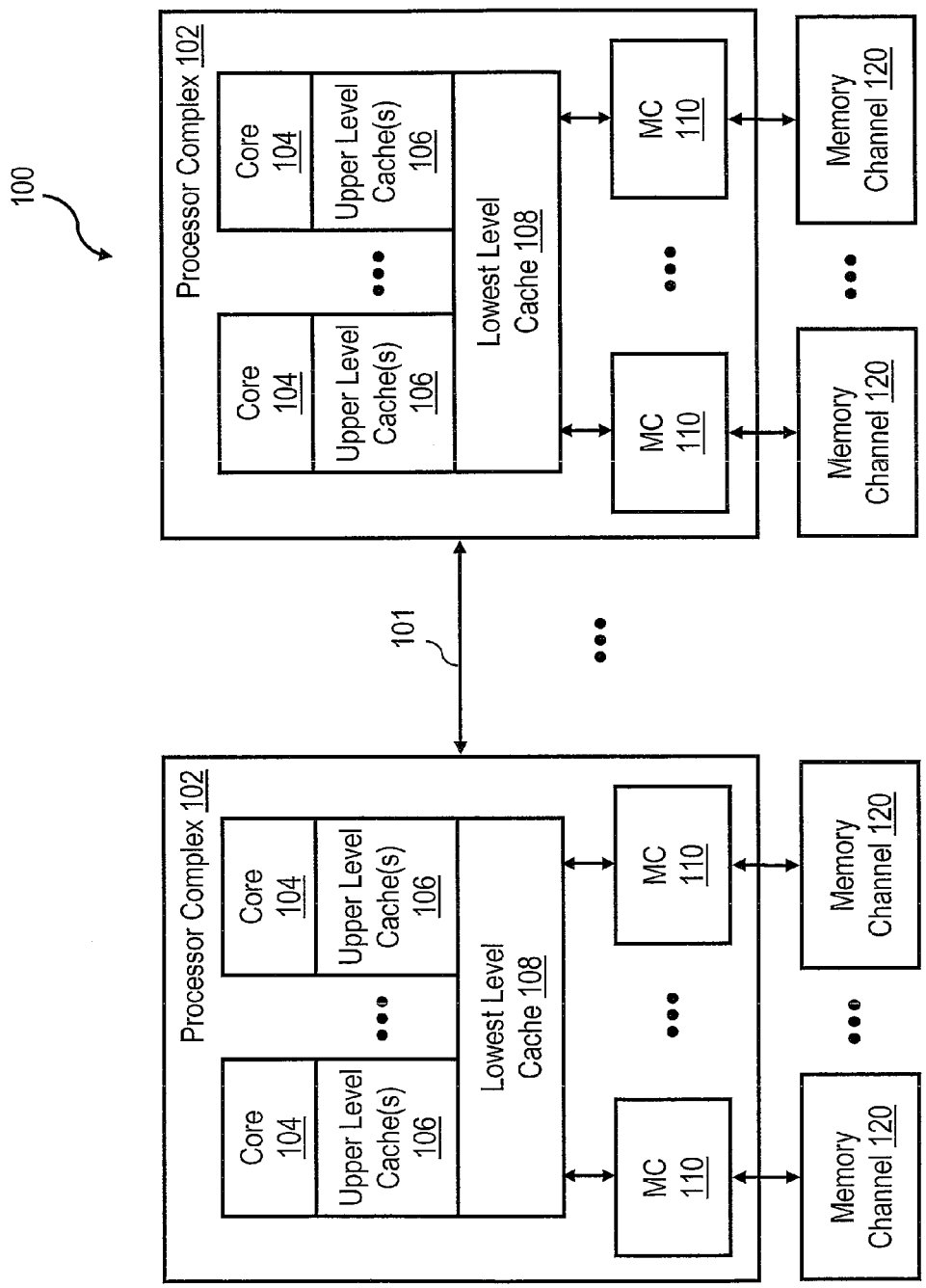
FIG. 1 is high level block diagram of an exemplary data processing system in accordance with one embodiment.

With reference now to FIG. 1, there is illustrated a high level block diagram of an exemplary data processing system 100 according to one embodiment. Data processing system 100 includes one or more (and in some embodiments, a multiplicity of) processor complexes 102 coupled for communication by a interconnect fabric 101, which may include, for example, one or more buses and/or switches.

Processor complexes 102, which may be implemented, for example, as chip multiprocessors (CMPs) or multi-chip module (MCMs), each include at least one processor core 104 for processing data under the direction of program instructions. Each processor core 104 is capable of simultaneously executing multiple independent hardware threads of execution.

Each processor core 104 is supported by a cache hierarchy including one or more upper level caches 106 and a lowest level cache 108. As will be appreciated by those skilled in the art, the cache hierarchy provides processor cores 104 with low latency access to instructions and data retrieved from system memory. While it is typical for at least the highest level cache (i.e., that with the lowest access latency) to be on-chip with the associated core 104, the lower levels of cache memory (including lowest level cache 108) may be implemented as on-chip or off-chip, in-line or lookaside cache, which may be fully inclusive, partially inclusive, or non-inclusive of the contents the upper levels of cache. As indicated, the lowest-level cache 108 can be (but is not required to be) shared by multiple processor cores 104, and further can optionally be configured as a victim cache.

Processor complex 102 additionally includes one or more memory controllers (MCs) 110 each controlling read and write access to system (or main) memory, which is the lowest level of storage addressable by the real address space of processor complex(es) 102. In an exemplary embodiment, each memory controller 110 is coupled by a memory bus 112 to at least one respective memory channel 120, each of which includes one or more ranks of system memory.

As will be appreciated, data processing system 100 may further include additional unillustrated components, such network interface cards, I/O adapters, non-volatile data storage, additional bus bridges, etc., as is known in the art.

Figure 2:
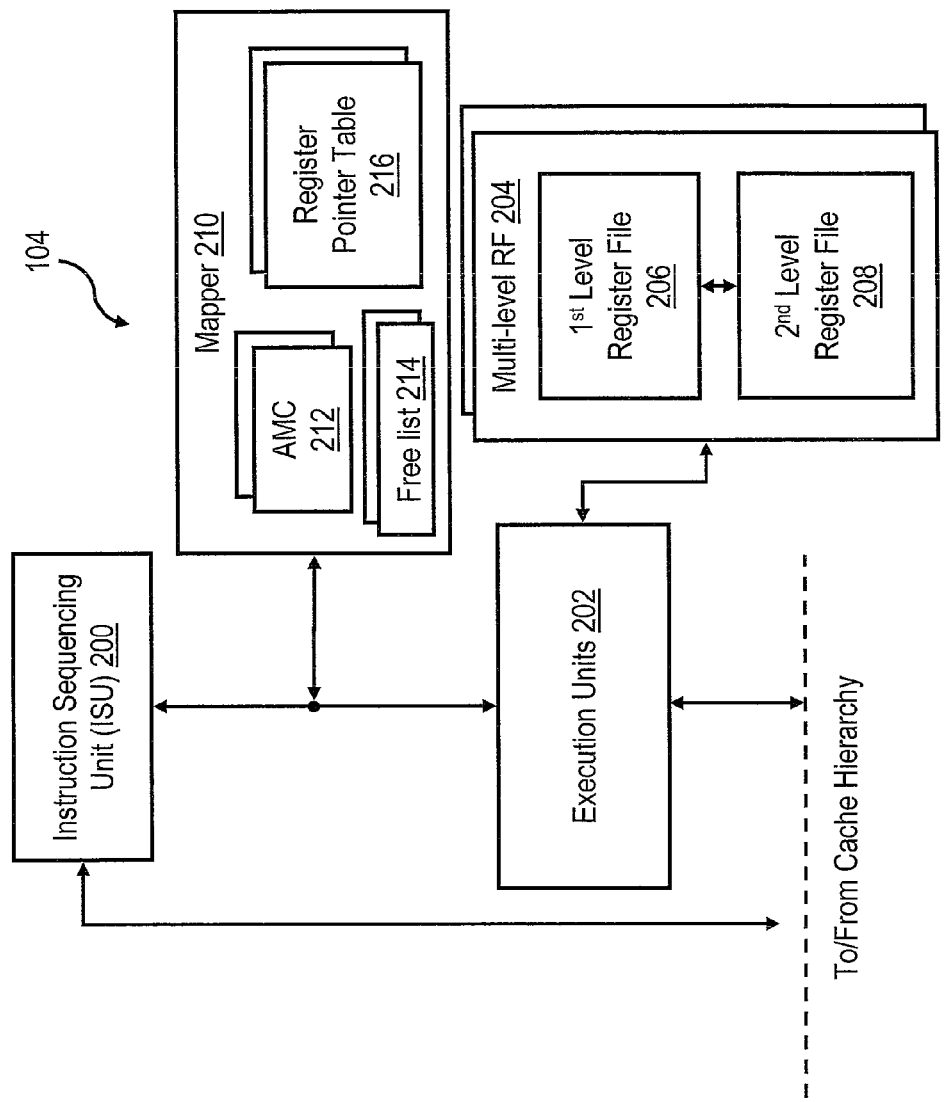
FIG. 2 is a more detailed view of a processor core of the data processing system of FIG. 1.

Referring now to FIG. 2, there is depicted a more detailed view of a processor core of data processing system 100 of FIG. 1. Each processor core 104 includes an instruction sequencing unit (ISU) 200 for fetching and ordering instructions for execution in multiple concurrent hardware threads, as well as one or more execution units 202 for executing the instructions in the multiple concurrent hardware threads. In at least some embodiments, execution units 202 may execute at least some instructions within a given hardware thread out-of-order and may further employ known techniques of speculation and branch prediction to enhance cycles-per-instruction (CPI) performance.

Coupled to execution units 202 is one multi-level register file (RF) 204 per concurrent hardware thread supported by processor core 104. Each multi-level register file 204, which includes at least a first level register file 206 and a second level register file 208, contains a plurality of physical registers providing the lowest latency storage for source and destination operands of the instructions executed by execution units 202. First level register file 206 preferably contains fewer physical registers than second level register file 208 and/or is physically closer to execution units 202, and accordingly has a lower access latency than second level register file 208. The contents of first level register file 206 include both architected register values, which represent the current non-speculative state of a thread, as well as non-architected register values, which represent working values not yet committed to the architected state of the thread.

In at least one embodiment, first level register file 206 contains fewer physical registers than would be necessary to provide storage for the operands of all instructions concurrently undergoing execution by processor core 104. Accordingly, processor core 104 includes a mapper 210 including logic and data structures to map logical registers referenced by instructions executed by execution units 202 to particular physical registers in first level register file 206 and second level register file 808. Specifically, the depicted embodiment of mapper 210 includes an architected mapper cache (AMC) 212 for each thread that tracks the assignment of physical registers in first level register file206 to logical registers referenced by instructions. Mapper 210 also includes a free list 214 for each thread that records the pool of physical registers in first level register file 206 that are free (currently unassigned to a logical register) and therefore available for assignment to a logical destination register referenced by a subsequent instruction in the thread. Finally, mapper 210 includes a register pointer table 216 for each thread that tracks the locations of architected register values evicted from first level register file 206 and placed into second level register file 208.

In contrast to first level register file 206, the physical registers in second level register file 208 are preferably unmapped, meaning that each physical register in second level register file 208 corresponds to a particular logical register in the register space of the instruction set architecture of processor core 104. As discussed further below, it is preferable if each logical register has two corresponding physical registers in second level register file 208, one to hold a speculative logical register value and another to hold a non-speculative or working logical register value. Thus, at any given time, second level register file 208 may contain architected, working, and speculative register values.

Figure 3:
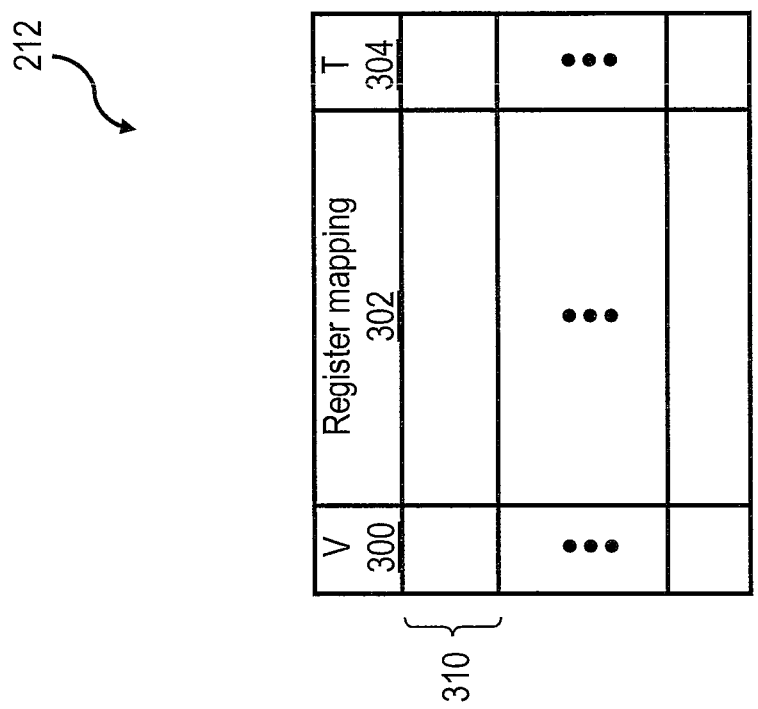
FIG. 3 is a more detailed view of an exemplary embodiment of the architected mapper cache (AMC) of FIG. 2.

With reference now to FIG. 3, there is illustrated a more detailed view of an exemplary embodiment of the architected mapper cache (AMC) 212 of FIG. 2. In the exemplary embodiment, AMC 212 includes a plurality of entries 310 for buffering temporary mappings between logical registers referenced by instructions and physical registers within first level register file 206. Each such entry 310 includes a valid field 300 (e.g., a single bit) indicating whether that entry 310 is valid or invalid, a register mapping field 302 indicating a logical-to-physical register mapping, and a transactional field 304 indicating (e.g., by a single bit) whether the register value is a speculative value within a transactional code section or a non-speculative value.

In one exemplary embodiment, AMC 22 is organized as a N-way set-associative cache, with each of M sets contains multiple entries 212. In this embodiment, each of the M sets in AMC 22 corresponds (e.g., via index bits of a logical register number) to greater than N logical registers.

Figure 4:
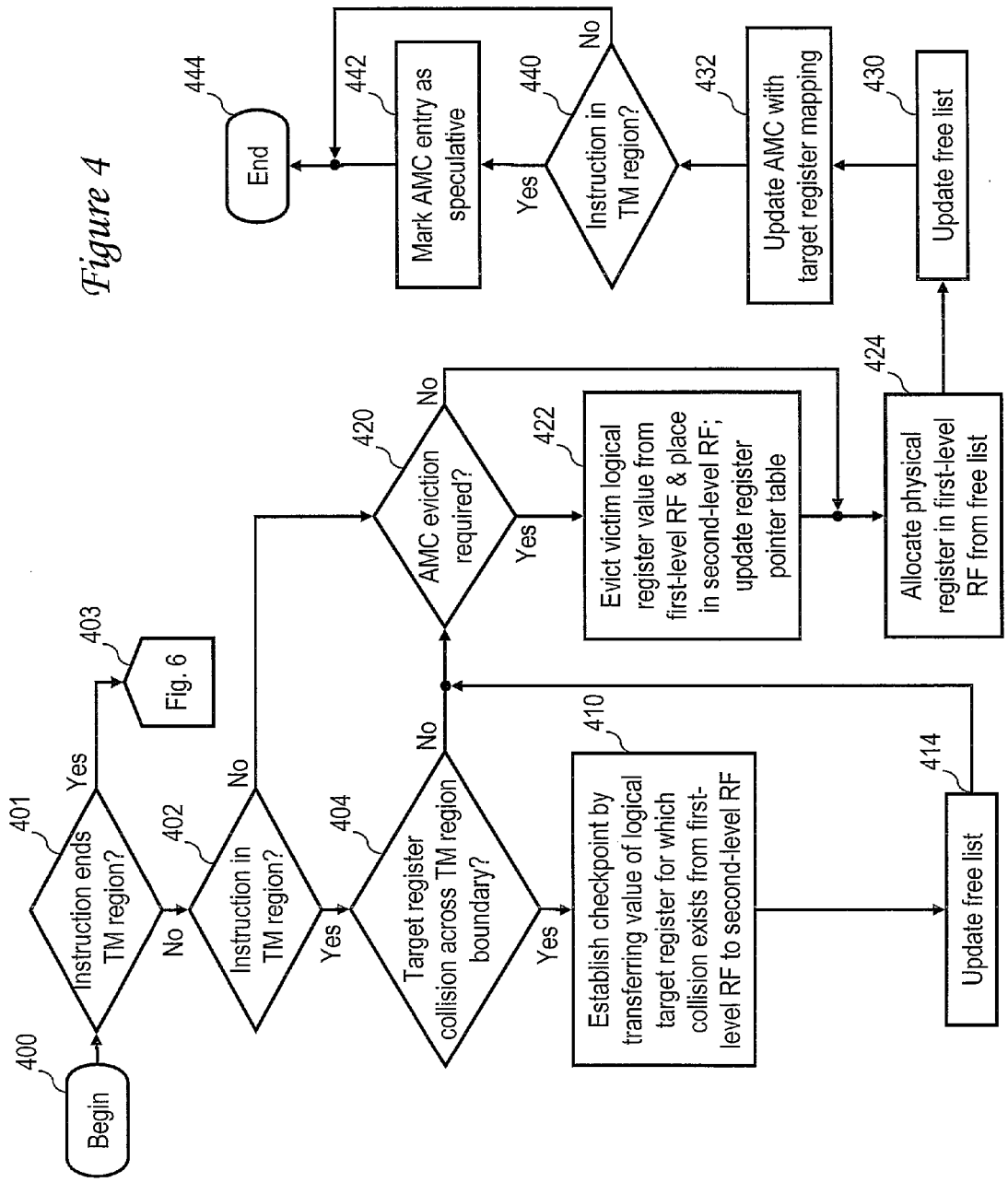
FIG. 4 is a high level logical flowchart of an exemplary process by which a mapper allocates a register from a multi-level register file to an instruction in one embodiment.

FIG. 4 is a high level logical flowchart of an exemplary process by which a mapper 210 allocates a register from a multi-level register file to an instruction in one embodiment. As a logical flowchart, FIG. 4 presents steps in a logical rather than strictly chronological sequence, meaning that in at least some embodiments certain of the illustrated steps can be performed in a different order than illustrated and/or in parallel.

Referencing FIG. 2 again, mapper 210 is coupled to receive each instruction issued to execution units 202. Thus, the exemplary process depicted in FIG. 4 begins at block 400 in response to mapper 210 receiving an instruction dispatched from instruction sequencing unit 200. Following block 400, the process proceeds to block 401, which illustrates mapper 210 determining whether or not the instruction demarks the end of a transactional code section of one of the concurrent hardware threads of processor core 104. As described further below with reference to FIGS. 7 and 8, the beginning and end of a transaction code section of a thread can be demarked, for example, by special purpose instruction opcodes, or alternatively, by fields of instructions that additionally perform arithmetic, logical and/or program control functions. In response to a determination at block 401 that the received instruction demarks the end of a transactional code section, the process depicted in FIG. 4 proceeds through page connector 403 to FIG. 6, which is described below.

Returning to block 401, if mapper 210 determines that the received instruction does not demark the end of a transactional code section of a thread, mapper 201 further determines at block 402 whether or not the instruction falls within a transactional code section of the thread. For example, mapper 210 can determine that processor core 104 is executing a transactional code section of a thread, for example, if mapper 210 has detected an instruction demarking the beginning of a transactional code section without detecting a corresponding instruction demarking the end of the transactional code section.

In response to mapper 210 determining at block 402 that the instruction does not belong to a transactional code section, the process proceeds to block 420, which is described below. If, however, mapper 210 determining at block 402 that the instruction falls within a transactional code section of a thread, mapper 210 further determines at block 404 whether or not the logical destination or target register referenced by the instruction collides with (i.e., matches) a logical destination register referenced by a previous instruction of the thread preceding the transactional code section. If not, the process proceeds to block 420, which is described below. If, however, mapper 210 determines that the logical destination register referenced by the instruction collides with a logical destination register referenced by a previous instruction of the thread preceding the transactional code section, the process proceeds to block 410.

Block 410 depicts mapper 210 establishing a checkpoint for the register value of the logical destination register referenced by the instruction in the transactional code section by transferring the register value from first level register file 206 to second level register file 208. In this manner, the non-speculative value of the logical destination register established prior to the transactional code section will be preserved in case the transactional code section is aborted. Mapper 210 additionally updates register pointer table 216 to identify the location of the non-speculative value of the logical register within second level register file 208. Thereafter, at block 414, mapper 210 adds the physical register in first level register file 206 to which the logical destination register was formerly mapped to free list 214, thus returning that physical register to the pool of physical registers available for mapping to a logical destination register. From block 414, the process proceeds to block 420.

At block 420, mapper 210 determines whether or not an eviction from AMC 212 is required in order to map the logical destination register referenced by the current instruction to a physical register in first level register file 206. To make this determination, mapper 210 can, for example, determine if there are any free (i.e., invalid) entries in AMC 212 in the set to which the logical destination register of the current instruction maps. If mapper 210 determines at block 420 that a free entry is available and therefore no eviction is required, the process proceeds from block 420 to block 424. Otherwise, the process passes from block 420 to block 422, which depicts mapper 210 evicting the value of a logical register from a physical register in first level register file 206 and installing the value of the logical register in the particular physical register in second level register file 208 corresponding to that logical register. The setting of the transactional field 304 associated with the evicted logical register value is similarly transferred from first level register file 206 and installed in second level register file 208. To track the register value in second level register file 208, mapper 210 then updates the relevant pointer in register pointer table 216 to point to the logical register value in second level register file 208.

Next, at blocks 424 and 430, mapper 210 allocates a physical register in first level register file 206 from free list 214 to hold the value of the logical destination register of the current instruction and removes the allocated physical register from free list 214. In addition, at block 432, mapper 210 records the mapping between the logical destination register and the physical register in an entry of AMC 212. In conjunction with recording the mapping, mapper 210 sets valid field 300 to indicate that the entry 212 is valid, and as indicated at blocks 440 and 442, also sets the transactional field 304 to indicate whether the instruction producing the register value is within a transactional code section (and therefore speculative) or not. Following block 440 or block 442, the process depicted in FIG. 4 ends at block 444.

As noted above, FIG. 4 presents steps in the destination register allocation process in a logical rather than strictly chronological manner. For example, in one preferred embodiment, mapper 210 performs the register allocation and update to free list 214 shown at blocks 424 and 430 at instruction dispatch time and subsequently performs the recording of the mapping in AMC 212 depicted at block 432 at instruction completion time. However, in an alternative embodiment, all of steps 424, 430 and 432 can all be performed at instruction completion time.

With reference now to FIG. 5, there is illustrated a high level logical flowchart of an exemplary method of translating a reference by an instruction to a logical source register from which an instruction operand is to be obtained in accordance with one embodiment. The exemplary process begins at block 500 in response to receipt by mapper 210 of an instruction referencing at least logical source register and thereafter proceeds to block 502. Block 502 depicts mapper 210 performing a lookup in AMC 212 to determine if the referenced logical source register is currently mapped to a physical register in first level register file 206.

Mapper 210 then determines at block 504 whether or not the lookup in AMC 212 resulted in a hit. If so, mapper 210 accesses the physical register in first level register file 206 indicated by the register mapping field 302 of the matching entry 310 to obtain the register value of the referenced logical source register (block 506). If, on the other hand, the lookup in AMC 212 results in a miss, mapper 210 accesses the physical register of the second level register file 208 assigned to the referenced logical source register to obtain the register value (block 510). As indicated above, second level register file 208 preferably contains multiple physical registers for each logical register. If second level register file 208 contains multiple register values for a given logical register, as will be the case if affirmative determinations are made at both of blocks 404 and 420 of FIG. 4, the logical register value to be accessed at block 510 is identified by the pointer in register pointer table 216 corresponding to the referenced logical register. Following either block 506 or block 510, the process passes to block 512, which illustrates mapper 210 providing the register value of the logical source register to execution units 202. Thereafter, the process ends at block 514.

With a physical register allocated to the logical destination register of the instruction in accordance with FIG. 4 and the value(s) of the logical source register(s), if any, accessed in accordance with FIG. 5, the instruction can be executed by execution units 202. Following execution of the instruction, mapper 210 places execution results, if any, returned by execution units 202 in the physical register previously mapped to the logical destination register of the instruction.

Referring now to FIG. 6, there is depicted a high level logical flowchart of an exemplary process by which a mapper 210 handles the termination of transactional execution of a code section of a thread in one embodiment. The process shown in FIG. 6 begins at block 600, for example, in response to receipt by mapper 210 of an instruction demarking the termination of a transactional code section, as described above at block 401 of FIG. 4.

In response to detection of an instruction demarking the end of a transactional code section of a thread, the process proceeds to block 604, which depicts mapper 210 determining whether or not the transactional code section ended successfully ("passed"). A successful end of the transactional code section can be indicated, for example, by the opcode of the instruction demarking the end of the transactional code section or by a separate success or failure indication, which may be received from execution units 202 or ISU 200 and/or may reside in a condition register of multi-level register file 204.

If mapper 210 determines at block 604 that the transactional code section concluded successfully, mapper 210 resets any transactional fields 304 that are set in AMC 212 or second level register file 208 to indicate that the associated logical register values are no longer speculative (block 610). Thus, mapper 210 commits the heretofore speculative execution results of the transactional code section of the thread to the architected state of the thread. Thereafter, the process shown in FIG. 6 ends at block 624.

Referring now to block 620, if the transactional code section did not end successfully, mapper 210 discards the execution results of the transactional code section held in first level register file 206. In particular, as indicated at block 620, mapper 210 resets the valid field 300 of (i.e., invalidates) each entry 310 in AMC 212 in which transactional field 304 is set and returns the physical registers of first level register file 206 mapped by such entries to free list 214. In addition, mapper 210 discards any execution results of the transactional code section held in second level register file 208. For example, as indicated at block 622, mapper 210 invalidates in second level register file 208 any logical register values marked as speculative and updates each associated pointer in register pointer table 216 with a null pointer. Thereafter, the process depicted in FIG. 6 ends at block 624.

Figures 7, 8:
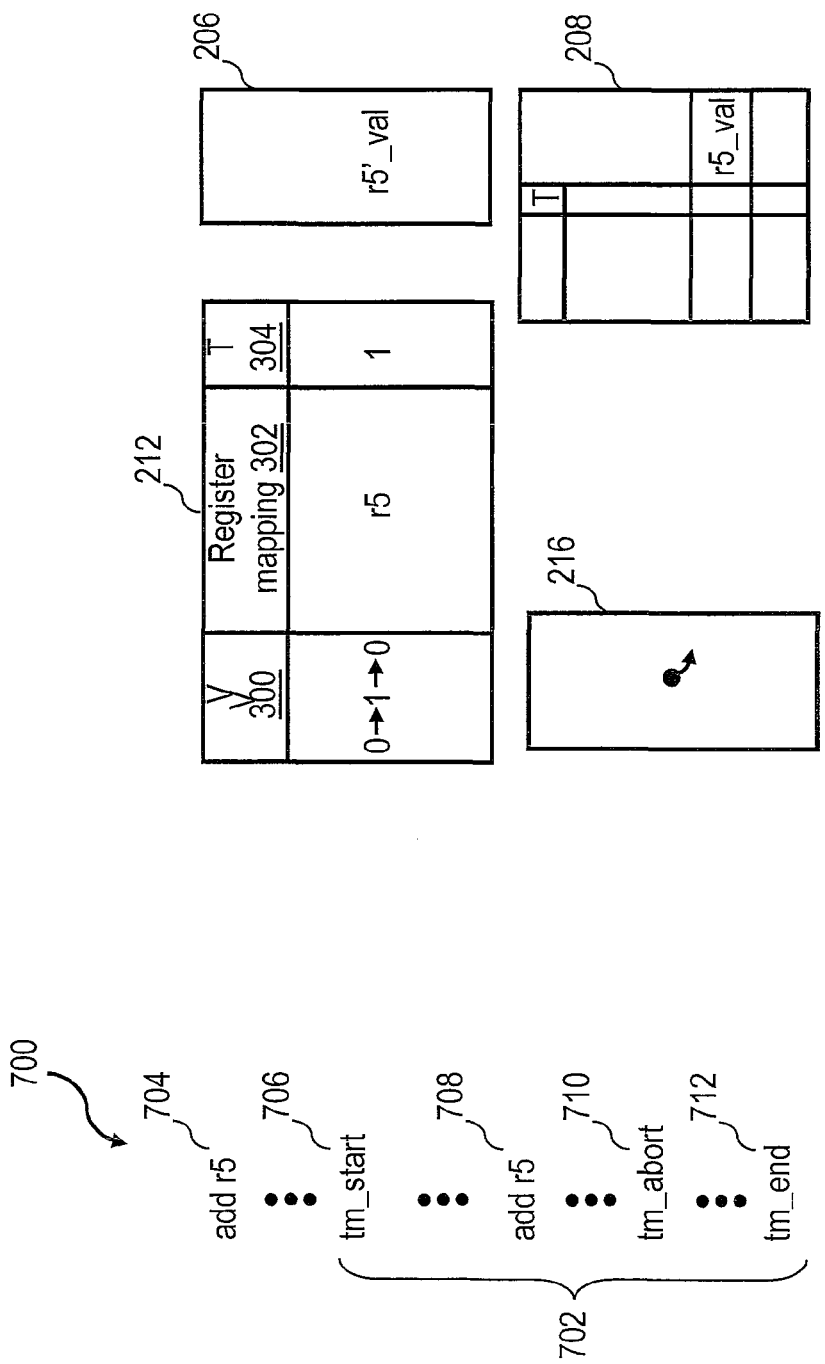
FIG. 7 illustrates an exemplary first thread including a transactional code section.
FIG. 8 depicts contents of the AMC, multi-level register file and register pointer table in the case in which processing of the transactional code section of FIG. 7 fails to complete successfully.

With reference now to FIG. 7, there is illustrated a portion of an exemplary first thread 700 including a transactional code section 702. Prior to transactional code section 702 in the program order of first thread 700 are one or more non-transactional instructions, such as add instruction 704, which references logical destination register r5. Within transactional code section 702, the beginning of which is demarked by initiating instruction 706 (i.e., tm_start), are one or more instructions, such as add instruction 708, which conditionally update the architected state of the thread if the transactional code section completes successfully. As indicated, add instruction 708 also targets logical destination register r5. In exemplary first thread 700, transactional code section 702 can terminate in either of two ways, namely, successfully through the execution of ending instruction 712 (e.g., tm_end) or unsuccessfully through the execution of abort instruction 710 (e.g., tm_abort). As indicated previously, if transactional code section 702 terminates through the execution of ending instruction 712, the execution results of transactional code section 702 are committed to the architected state of thread 700, and if transactional code section 702 terminates through the execution of abort instruction 710, the execution results of transactional code section 702 are not committed to architected state of thread 700 and are instead discarded.

Referring now to FIG. 8, there is depicted the contents of AMC 212, multi-level register file 204 and register pointer table 216 in the case in which processing of transactional code section 702 of FIG. 7 fails to complete successfully. In particular, in response to mapper 210 detecting a collision between the logical destination registers of add instructions 704 and 708 at block 404 of FIG. 4, mapper 210 establishes a checkpoint as described at block 410 of FIG. 4 by transferring the register value of logical destination register r5 produced by add instruction 704 (i.e., r5_val) from first level register file 206 to second level register file 208. Mapper 210 then allocates a free physical register in first level register file 206 to logical destination register r5, records the mapping between the allocated physical register and logical destination register r5 in register mapping field 302 of an entry 310 of AMC 212, and sets valid field 300 (e.g., to 1) as described at blocks 424 and 432 of FIG. 4. In addition, to indicate that the register value of logical destination register r5 of add instruction 708 (i.e., r5'_val) is speculative, mapper 210 sets transaction field 304 of the entry 310 in AMC 212. Thereafter, in response to receipt of abort instruction 710, mapper 210 resets valid field 300 of the entry 310 in AMC 212, as shown in FIG. 8 and described at block 620 of FIG. 6, thus discarding the speculative register value of logical destination register r5. Subsequent references to logical register r5 will be satisfied from second level register file 208, as described above with reference to block 510 of FIG. 5.

Figure 9:
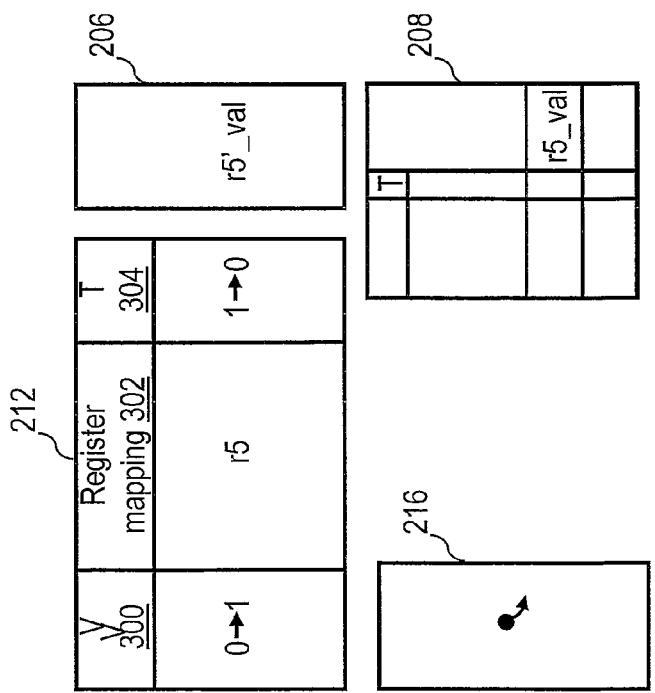
FIG. 9 illustrates contents of the AMC, multi-level register file and register pointer table in the case in which processing of the transactional code section of FIG. 7 completes successfully.

With reference now to FIG. 9, there is illustrates the contents of AMC 212, multi-level register file 204 and register pointer table 216 in the contrary case in which processing of transactional code section 702 of thread 700 of FIG. 7 completes successfully. In this case, in response to mapper 210 receiving ending instruction 712 rather than abort instruction 710, mapper 210 resets transaction field 304 to indicate that the register value of the logical destination register is no longer speculative, as described above with reference to block 610 of FIG. 6. In accordance with the process of FIG. 5, the new register value r5'_val will subsequently be accessed in lieu of the stale register value r5_val based upon lookup hits for logical register r5 in AMC 212.

Figure 10:
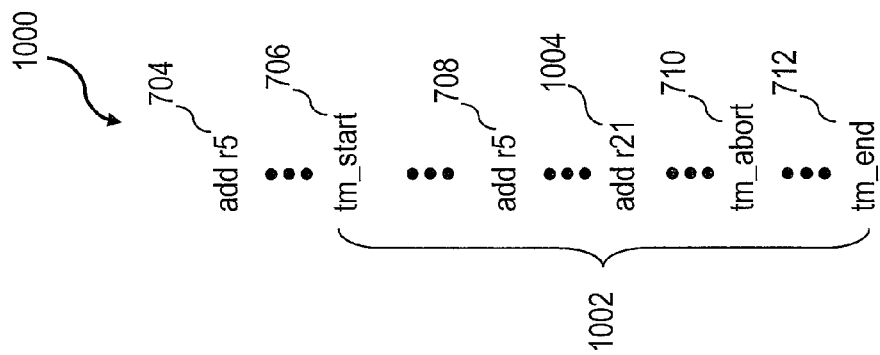
FIG. 10 illustrates an exemplary second thread including a transactional code section.

Referring now to FIG. 10, there is depicted an exemplary second thread 1000 including a transactional code section 1002. As indicated by like reference numerals, second thread 1000 is similar to first thread 700 and includes previously described instructions 704, 706, 708, 710 and 712. However, transactional code section 1002 of second thread 1000 additionally includes add instruction 1004, which references logical destination register r21. In this example, it is assumed that logical register r21 maps to the same set in AMC 212 as logical register r5.

Figure 11:
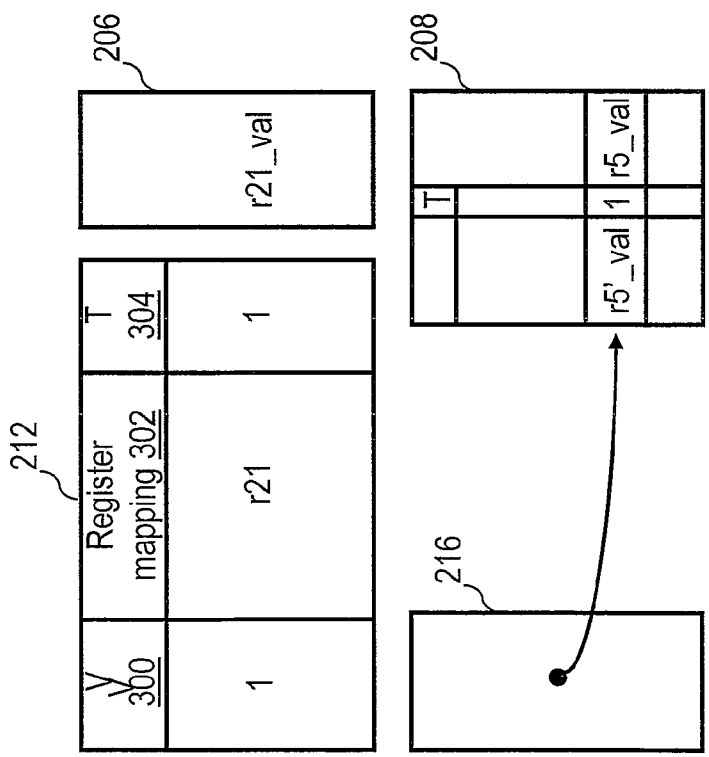
FIG. 11 depicts contents of the AMC, multi-level register file and register pointer table in the case in which a physical register in the first level register file allocated to a first logical register referenced in the transaction code section of FIG. 10 is reallocated to a second logical register.

As indicated in FIG. 11, in response to mapper 210 detecting a collision between the logical destination registers of add instructions 704 and 708 at shown block 404 of FIG. 4, mapper 210 establishes a checkpoint as described at block 410 of FIG. 4 by transferring the register value of logical destination register r5 produced by add instruction 704 (i.e., r5_val) from first level register file 206 to second level register file 208. Mapper 210 then allocates a free physical register in first level register file 206 to logical destination register r5, records the mapping between the allocated physical register and logical destination register r5 in register mapping field 302 of an entry 310 of AMC 212, and sets valid field 300 (e.g., to 1) as described at blocks 424 and 432 of FIG. 4. In addition, to indicate that the register value of logical destination register r5 of add instruction 708 (i.e., r5'_val) is speculative, mapper 210 sets transaction field 304 of the entry 310 in AMC 212.

In response to receipt of add instruction 1004, mapper 210 determines at block 420 of FIG. 4 that an entry 310 must be evicted from AMC 212 to accommodate the mapping for logical register r21. Accordingly, as shown in FIG. 11 and described with reference to block 422 of FIG. 4, mapper 210 evicts logical register value r5'_val from first level register file 206 and installs it in second level register file 208 in association with a set transaction field to identify logical register value r5'_val as speculative. As further shown in FIG. 11 and as also depicted in block 422 of FIG. 4, mapper 210 updates pointer register table 216 to point to logical register value r5'_val.

Figure 12:
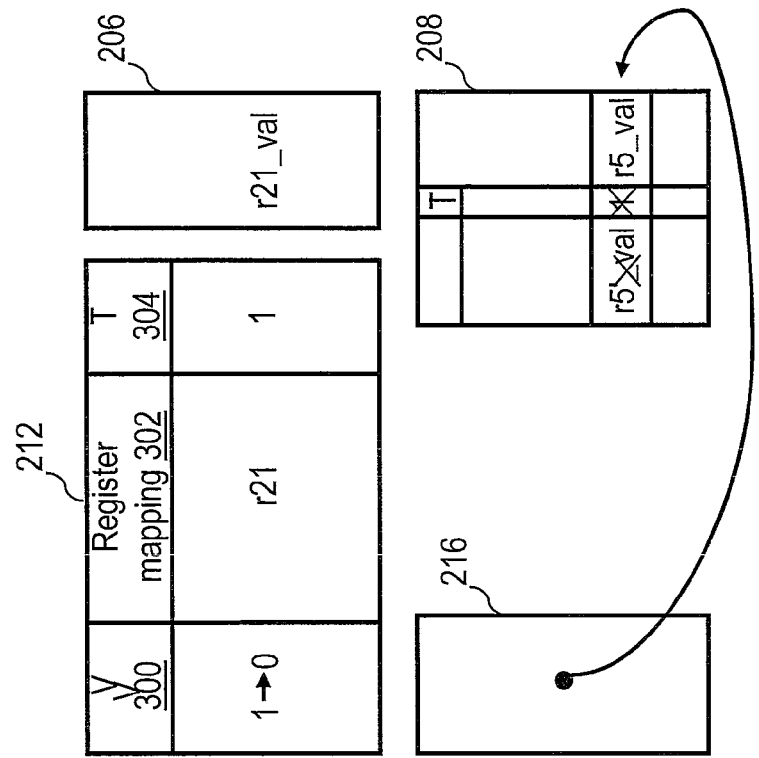
FIG. 12 illustrates contents of the AMC, multi-level register file and register pointer table in the case in which processing of the transactional code section of FIG. 10 fails to complete successfully.

Referring now to FIG. 12, in the case that transactional code section 1002 terminates unsuccessfully (e.g., via abort instruction 710), mapper 210 resets valid field 300 of the entry 310 allocated to logical register r21 in AMC 212, as shown in FIG. 12 and described at block 620 of FIG. 6, thus discarding the speculative register value of logical destination register r21. Further, as shown in FIG. 12 and block 622 of FIG. 6, mapper 210 also updates register pointer table 216 to point to register value r5_val rather than r5'_val, thus discarding the speculative execution results of add instruction 708. Subsequent references to logical register r5 will thus be satisfied by accessing register value r5_val from second level register file 208, as described above with reference to block 510 of FIG. 5.

Figure 13:
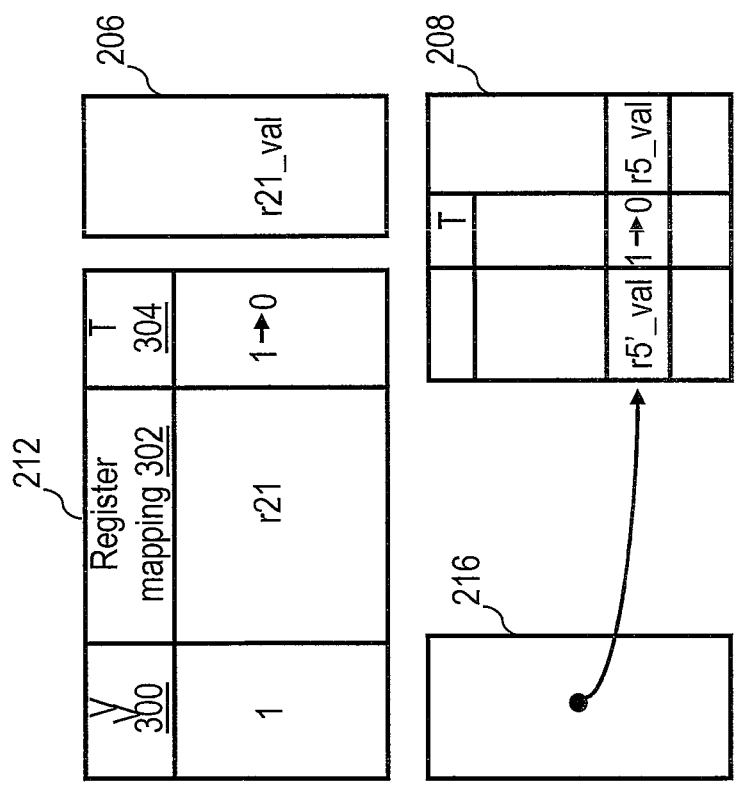
FIG. 13 depicts contents of the AMC, multi-level register file and register pointer table in the case in which processing of the transactional code section of FIG. 10 completes successfully.

With reference now to FIG. 13, in the case that transactional code section 1002 of thread 1000 terminates successfully (e.g., via end instruction 712), mapper 210 resets transactional field 304 of the entry 310 allocated to logical register r21 in AMC 212, as illustrated in FIG. 13 and at block 610 of FIG. 6. Further, as shown in FIG. 13 and at block 610 of FIG. 6, mapper 210 similarly updates the transactional indication associated with logical register value r5'_val in second level register file 208. Thereafter, a reference to logical register r21 can be satisfied from first level register file 206, and a reference to logical register r5 will be satisfied with register value r5'_val from second level register file 208.

As has been described, an exemplary embodiment of a data processing system suitable for executing multiple concurrent hardware threads utilizing transactional code sections to synchronize memory access includes a processor having a multi-level register file. The multi-level register file includes a first level register file having a lower access latency and a second level register file having a higher access latency, where each of the first and second level register files includes a plurality of physical registers. As the processor executes a thread, a first register value of a logical register obtained as an execution result of a first instruction in the thread is placed in a first physical register of the first level register file. A first mapping between the logical register and the first physical register is also recorded in a mapping data structure, and the first register value is marked as non-speculative.

In response to processing a second instruction in a transactional code section of the thread to obtain as an execution result a second register value of the logical register, the first register value is moved to the second level register file, and the second register value is placed in a second physical register of the first level register file. Accordingly, the first mapping in the mapping data structure is replaced with a second mapping between the logical register and the second physical register. In addition, because the second instruction is in the transactional code section, the second register value is initially marked as speculative. In response to unsuccessful termination of the transactional code section, the second register value in the first level register file is designated as invalid, meaning the first register value in the second level register file becomes a working value of the logical register. On the other hand, in response to successful termination of the transactional code section, the second register value in the first level register file is designated as non-speculative.

It should thus be noted that upon entry of a transactional code section, there is no need to move data contained in the first level register file en masse into the second level register file. Instead, checkpoints in the second level register file are preferably established for only logical destination registers on a register-by-register basis as logical register collisions spanning the boundary of a transactional code section are detected. Further, upon unsuccessful termination of a transactional code section, there is no necessity to move data from the second level register file back into the first level register file. Instead, the invalidation of the mapping of the speculative data in the first level register file leaves the checkpointed data held in the second level register file as the working data.

While one or more preferred embodiments have been shown and described, it will be understood by those skilled in the art that various changes in form and detail may be made therein without departing from the spirit and scope of the appended claims. For example, although certain aspects have been described with respect to a logic that directs particular functions herein disclosed, it should be understood that such functions can alternatively be implemented by a program product including a computer-readable storage medium storing program code that can be processed by a data processing system. Without limitation, the program product can include, for example, an optical or magnetic disk or non-volatile memory that encodes software or firmware that can be processed by a computer or component thereof to perform some or all of the described functions.

Further, the program product may include a computer readable storage medium storing data and/or instructions that, when executed or otherwise processed on a data processing system, generate a logically, structurally, or otherwise functionally equivalent representation (including a simulation model) of hardware components, circuits, devices, or systems disclosed herein. Such data and/or instructions may include hardware-description language (HDL) design entities or other data structures conforming to and/or compatible with lower-level HDL design languages such as Verilog and VHDL, and/or higher level design languages such as C or C++. Furthermore, the data and/or instructions may also employ a data format used for the exchange of layout data of integrated circuits and/or symbolic data format (e.g. information stored in a GDSII (GDS2), GL1, OASIS, map files, or any other suitable format for storing such design data structures).

What is claimed is:

1. A method of data processing in a processor having a multi-level register file including a first level register file having a lower access latency and a second level register file having a higher access latency, each of the first and second level register files including a plurality of physical registers, said method comprising:
   prior to execution of a particular transactional code section, placing one or more non-speculative register values in the first level register file;
   in response to processing one or more instructions in the transactional code section to generate as an execution result one or more speculative register values that are each assigned a respective register identifier that collides with that of one of the one or more non-speculative register values, moving one or more non-speculative register values from the first level register file to the second level register file on a register-by-register basis as needed to resolve collisions rather than en masse and placing the one or more speculative register values in the first level register file;
   in response to unsuccessful termination of the transactional code section, designating the one or more speculative register values in the first level register file as invalid, such that the one or more non-speculative register values moved to the second level register file belong to a working value set; and
   in response to successful termination of the transactional code section, designating the one or more speculative register values in the first level register file as non-speculative.

2. The method of claim 1, wherein:
   the first level register file is mapped utilizing a mapping data structure;
   the second level register file is unmapped; and
   moving the one or more non-speculative register values to the second level register file comprises moving a first register value in the first level register file to a physical register in the second level register file assigned to a logical register associated with the first register value by a first mapping in the mapping data structure.

3. The method of claim 2, and further comprising:
   in response to processing another instruction referencing the logical register as a source register of an instruction operand, obtaining a second register value of the logical register from the first level register file if the mapping data structure indicates the second register value is valid and otherwise obtaining the first register value of the logical register from the second level register file.

4. The method of claim 2, wherein:
   the mapping data structure is a cache; and
   the method further comprises recording the first mapping in the cache.

5. The method of claim 2, wherein:
   the logical register is a first logical register;
   in response to removal from the mapping data structure of a second mapping of a second logical register having a second register value that is an execution result of the transactional code section:
      moving the second register value from the first register file to the second register file;
      marking the second register value in the second register file as speculative; and
      identifying the second register value as a working value of the second logical register.

6. The method of claim 5, wherein:
   the identifying includes identifying the second register value with a pointer;
   the method further comprises:
      holding a potentially stale third register value of the second logical register in the second level register file;
      in response to unsuccessful termination of the transactional code section, updating the pointer to identify the third register value as the working value of the second logical register.

7. A processor, comprising:
   an instruction sequencing unit;
   an execution unit;
   a multi-level register file including a first level register file having a lower access latency and a second level register file having a higher access latency, each of the first and second level register files including a plurality of physical registers, wherein the first level register file, prior to execution of a particular transactional code section, holds one or more non-speculative register values; and
   logic that, in response to processing of one or more instructions in the transactional code section to generate as an execution result one or more speculative register values that are each assigned a respective register identifier that collides with that of one of the one or more non-speculative register values, moves one or more non-speculative register values from the first level register file to the second level register file on a register-by-register basis as needed to resolve collisions rather than en masse and places the one or more speculative register values in the first level register file;
   wherein the logic, responsive to unsuccessful termination of the transactional code section, designates the one or more speculative register values in the first level register file as invalid, such that the one or more non-speculative register values moved to the second level register file belong to a working value set, and responsive to successful termination of the transactional code section, designates the one or more speculative register values in the first level register file as non-speculative.

8. The processor of claim 7, wherein:
   the processor includes a mapping data structure;
   the logic includes a mapper that maps the first level register file utilizing the mapping data structure;
   the second level register file is unmapped; and
   the mapper moves a first register value among the one or more non-speculative register values from the first level register file to a physical register in the second level register file that is assigned to a logical register associated with the first register value by a first mapping in the mapping data structure.

9. The processor of claim 8, wherein the processor, responsive to processing another instruction referencing the logical register as a source register of an instruction operand, obtains a second register value of the logical register from the first level register file if the mapping data structure indicates the second register value is valid and otherwise obtains the first register value of the logical register from the second level register file.

10. The processor of claim 8, wherein the mapping data structure is a cache.

11. The processor of claim 8, wherein:
    the logical register is a first logical register;
    the mapper, responsive to removal from the mapping data structure of a second mapping of a second logical register having a second register value that is an execution result of the transactional code section, moves the second register value from the first register file to the second register file, marks the second register value in the second register file as speculative, and identifies the second register value as a working value of the second logical register.

12. The processor of claim 11, wherein:
the mapper includes a pointer table that identifies the second register value as the working value of the second logical register;
the second level register file holds a potentially stale fourth register value of the second logical register;
the mapper, responsive to unsuccessful termination of the transactional code section, updates the pointer table to identify the third register value as the working value of the second logical register.

13. A data processing system, comprising:
a system memory;
a plurality of processor cores coupled for communication with the system memory, wherein a processor core among the plurality of processor cores includes:
an instruction sequencing unit;
an execution unit;
a multi-level register file including a first level register file having a lower access latency and a second level register file having a higher access latency, each of the first and second level register files including a plurality of physical registers, wherein the first level register file, prior to execution of a particular transactional code section, holds one or more non-speculative register values; and
logic that, in response to processing of one or more instructions in the transactional code section to generate as an execution result one or more speculative register values that are each assigned a respective register identifier that collides with that of one of the one or more non-speculative register values, moves one or more non-speculative register values from the first level register file to the second level register file on a register-by-register basis as needed to resolve collisions rather than en masse and places the one or more speculative register values in the first level register file;
wherein the logic, responsive to unsuccessful termination of the transactional code section, designates the one or more speculative register values in the first level register file as invalid, such that the one or more non-speculative register values moved to the second level register file belong to a working value set, and responsive to successful termination of the transactional code section, designates the one or more speculative register values in the first level register file as non-speculative.

14. The data processing system of claim 13, wherein:
the processor includes a mapping data structure;
the logic includes a mapper that maps the first level register file utilizing the mapping data structure;
the second level register file is unmapped; and
the mapper moves a first register value among the one or more non-speculative register values from the first level register file to a physical register in the second level register file that is assigned to a logical register associated with the first register value by a first mapping in the mapping data structure.

15. The data processing system of claim 14, wherein the processor, responsive to processing another instruction referencing the logical register as a source register of an instruction operand, obtains a second register value of the logical register from the first level register file if the mapping data structure indicates the second register value is valid and otherwise obtains the first register value of the logical register from the second level register file.

16. The data processing system of claim 14, wherein the mapping data structure is a cache.

17. The data processing system of claim 14, wherein:
the logical register is a first logical register;
the mapper, responsive to removal from the mapping data structure of a second mapping of a second logical register having a second register value that is an execution result of the transactional code section, moves the second register value from the first register file to the second register file, marks the second register value in the second register file as speculative, and identifies the second register value as a working value of the second logical register.

18. The data processing system of claim 17, wherein:
the mapper includes a pointer table that identifies the second register value as the working value of the second logical register;
the second level register file holds a potentially stale third register value of the second logical register;
the mapper, responsive to unsuccessful termination of the transactional code section, updates the pointer table to identify the third register value as the working value of the second logical register.

19. A method of processing a thread in a processor, the method comprising:
processing in a processor core a thread having a transactional code section;
storing by architected registers in a first level register file data associated with completed instructions of the thread, wherein data stored from the transactional code section is initially designated as speculative;
in response to the processor core executing instructions in the transactional code section to produce data and allocating one or more registers in the first level register file for storage of the data produced by execution of the instructions in the transactional code section, the one or more allocated registers having non-speculative data stored therein prior to entering the transactional code section, moving the previously stored non-speculative data from the one or more allocated registers into a second level register file as needed on a register-by-register basis rather than en masse;
in response to determining that data stored in the first level register file from the transactional code section should be aborted, designating, in a mapping data structure, data from the transactional code section as invalid, such that the previously stored non-speculative data in the second level register file becomes working data; and
in response to determining that data stored in the first level register file from the transactional code section should not be aborted, designating the data in the first level register file from the transactional code section as no longer speculative.

20. The method of claim 19, wherein:
the second level register file is unmapped; and
moving the previously stored non-speculative data comprises moving the previously stored non-speculative data to one or more physical registers in the second level register file assigned to one or more logical registers associated with the non-speculative data.

21. The method of claim 19, and further comprising:
obtaining a source operand value from the first level register file value if the mapping data structure indicates the data in the first level register file is valid and otherwise obtaining the source operand value from the second level register file.

22. The method of claim 19, wherein:
the mapping data structure is a cache; and
the designating comprises designating the data from the transactional code section as invalid in the cache.

23. A program product, comprising:
a computer-readable memory; and
program code stored within the computer-readable memory that when processed causes a computer including a processor having a multi-level register file including a first level register file having a lower access latency and a second level register file having a higher access latency to perform:
   prior to execution of a particular transactional code section, placing one or more non-speculative register values in the first level register file;
   in response to processing one or more instructions in the transactional code section to generate as an execution result one or more speculative register values that are each assigned a respective register identifier that collides with that of one of the one or more non-speculative register values, moving one or more non-speculative register values from the first level register file to the second level register file on a register-by-register basis as needed to resolve collisions rather than en masse and placing the one or more speculative register values in the first level register file;
   in response to unsuccessful termination of the transactional code section, designating the one or more speculative register values in the first level register file as invalid, such that the one or more non-speculative register values moved to the second level register file belong to a working value set; and
   in response to successful termination of the transactional code section, designating the one or more speculative register values in the first level register file as non-speculative.

24. The program product of claim 23, wherein:
the first level register file is mapped utilizing a mapping data structure;
the second level register file is unmapped; and
moving the one or more non-speculative register values to the second level register file comprises moving a first register value in the first level register file to a physical register in the second level register file assigned to a logical register associated with the first register value by a first mapping in the mapping data structure.

25. The program product of claim 24, wherein the program code further causes the computer to perform:
   in response to processing another instruction referencing the logical register as a source register of an instruction operand, obtaining a second register value of the logical register from the first level register file if the mapping data structure indicates the second register value is valid and otherwise obtaining the first register value of the logical register from the second level register file.

26. The method of claim 19, wherein:
the processor includes a mapping data structure that stores mappings of logical registers to physical registers in the first level register file;
the method further comprises:
   in response to removal, from the mapping data structure, of a mapping between a physical register in the first level register file and a logical register having a register value that is an execution result of the transactional code section:
      moving the register value from the first register file to the second register file;
      marking the register value in the second register file as speculative; and
      identifying the register value as a working value of the logical register.

27. The method of claim 26, wherein:
the register value is a first register value;
the identifying includes identifying the first register value with a pointer;
the method further comprises:
   holding a potentially stale second register value of the logical register in the second level register file;
   in response to unsuccessful termination of the transactional code section, updating the pointer to identify the second register value as the working value of the logical register.

* * * * *